Patented Feb. 22, 1949

2,462,449

UNITED STATES PATENT OFFICE 2,462,449

PREPARATION OF GROWTH PROMOTING SUBSTANCES

Roger J. Williams, Corvallis, Oreg., assignor to Research Corporation, New York, N. Y., a corporation of New York No Drawing. Application April 3, 1939, Serial No. 265,799

5 Claims. (Cl. 260—534)

This invention relates to the production of substances useful for the growth of plants and micro-organisms and believed to be necessary for the proper nutrition of animals. Substances of this character are believed to exist in the tissues of living things very generally according to existing evidence. One of these hypothetical substances I named pantothenic acid, the name being derived from Greek words meaning "from everywhere." This substance was discovered by me in 1933 (see Journal of the American Chemical Society, vol. 55, p. 2912, 1933). I have either solely or jointly with my assistants published various papers concerning this substance as follows:

R. J. Williams and D. H. Saunders, Biochemical Journal, vol. 28, p. 1887, 1934.

R. J. Williams and R. Moser, Journal American Chemical Society, vol. 56, p. 169, 1934.

E. Rohrman, E. Burget, and R. J. Williams, Proceedings Society of Experimental Biology and Medicine, vol. 32, p. 473, 1934.

O. H. McBurney, W. B. Bollen, and R. J. Williams, Proceedings National Academy of Science, vol. 21, p. 301, 1935.

R. J. Williams and E. Rohrman, Plant Physiology, vol. 10, p. 559, 1935.

R. J. Williams, W. A. Mosher, and E. Rohrman, Biochemical Journal, vol. 30, p. 2036, 1936.

These physiologically important substances are characterized by being peptide-like condensation products of $\beta$-alanine ($NH_2$—$CH_2$—$CH_2$—$COOH$) with other acids. While the term "peptide" is commonly used to designate condensation products of two amino acids, the peptide-like substances embodying this invention have a structure which may be depicted as a union of the amino acid known as $\beta$-alanine through the nitrogen thereof with a fatty acid and preferably with an $\alpha$-hydroxy acid of this nature which undergoes spontaneous lactonization. These structures are termed non-amino peptides in the specification and in the annexed claims and it is to be understood that this term is intended to include only compounds of the type just described. The acids and lactones which are combined with $\beta$-alanine in accordance with the invention to form non-amino peptides are termed herein fatty acids and the corresponding lactones to distinguish them from acids and lactones which contain elements besides carbon, hydrogen and oxygen.

Pantothenic acid may be obtained from a natural source by the following process:

The autolysate from sheep liver is treated with fuller's earth to remove basic substances, then brought to about pH 3.5 and the physiologically active acid adsorbed by Norite charcoal. This is eluted with dilute ammonia, neutralized, and evaporated to dryness in the presence of brucine alkaloid, brucine oxalate, and infusorial earth. This dry material is ground and extracted with chloroform and the chloroform extracted with a small proportion of water. The resulting brucine salts, which include the brucine salt of pantothenic acid, are subjected to an elaborate fractionation procedure involving distribution between the two immiscible solvents, water and chloroform. The fractions are tested for physiological activity during the process.

The concentrated brucine salt is converted into calcium salts by shaking with lime water and the brucine removed by chloroform extraction. The calcium salts are further fractionated according to the degree of purity desired, using mercuric chloride to remove impurities, and various solvents for fractional precipitation. More details of the elaborate process are given in the following reference:

R. J. Williams, J. H. Truesdail, H. H. Weinstock, Jr., E. Rohrmann, C. M. Lyman, and C. H. McBurney, Journal American Chemical Society, vol. 60, p. 2719, 1938.

Studies of the structure of the physiologically active constituent are found in the following paper:

R. J. Williams, H. H. Weinstock, Jr., E. Rohrmann, J. H. Truesdail, Herschel K. Mitchell, and C. E. Meyer, Journal American Chemical Society, vol. 61, p. 454, 1939.

The product is further purified by acetylation with acetic anhydride in pyridine, followed by methylation with diazomethane, extraction with ether and distillation in a molecular still at about 110°. The free pantothenic acid is regenerated by removal of the acetyl and methyl groups by allowing the distillate to stand in 1.3 normal alcoholic potassium hydroxide solution for one hour at room temperature. In its purest state so far obtained, it is effective for promoting the growth of Streptococcus lactis when no more than 4 millionths of a microgram are used per cubic centimeter of medium.

The above described process is very laborious and expensive, the yields are extremely small and the substance obtained is not entirely pure. An object of the invention is to produce pantothenic acid and other substances of like physiological properties in pure form, and in a cheaper and more efficient manner.

For this purpose I proceed by synthetic means. The resulting products are able to promote the growth of various yeasts, certain molds, alfalfa seedlings, certain liverworts, lactic acid bacteria, diphtheria bacilli, and young chicks, and are presumed to have a broader physiological significance which can only be revealed fully by future experiment.

Having described my invention in general terms I now set forth below instructions for the practice of the invention in specific examples.

*Example 1.*—100 milligrams α-hydroxy γ-n-valerolactone are allowed to react at 30° with 1 gram of β-alanine ethyl ester

for 24 hours. The reaction product is hydrolysed by allowing it to react for one hour at 30° with 0.3 normal sodium carbonate solution. Thereby the ethyl ester of the α, γ dihydroxy valeryl β-alanine first formed is converted into the free acid form according to the following reaction:

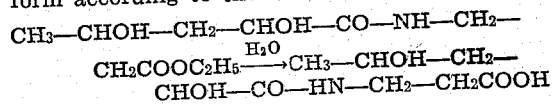

The product exhibits growth promoting properties. This may be demonstrated by testing the product by adding 0.1 milligram thereof to 12 cc. of basal medium of Snell, Strong and Peterson, of Biochemical Journal, 31, 1789 (1937), for lactic acid bacteria (this medium contains alkali treated peptone). The growth of the bacteria is thereby promoted substantially.

*Example 2.*—100 milligrams of α-hydroxy-β-methyl-γ-n-butyro-lactone are allowed to react with 500 milligrams of β-alanine ethyl ester for 1½ hours at 30°. The reaction product is hydrolysed and tested in the same manner as in Example 1. The final product contains in physiologically significant amounts the substance:

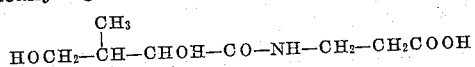

which shows physiological activity comparable with that produced in Example 1.

*Example 3.*—According to this synthesis β-alanine-ethyl ester is condensed with the lactone derived from acid cleavage of the concentrated calcium salt referred to above. For this purpose it is unnecessary to purify the concentrated calcium salt completely. The crude calcium salt is hydrolysed by dissolving it in normal hydrochloric acid and heating the solution for 1½ hours at 100° C. The resulting solution is evaporated to dryness at 50° and the residue containing the crude lactone is allowed to react with an excess of β-alanine-ethyl ester for 18 hours at 5°. The resulting product after hydrolysis as in the previous examples possesses very high potency for stimulating the growth of yeast or *Streptococcus lactis*.

The substance used in this example for condensation with an ester or salt of β-alanine is a lactone because although it is neutral it combines with alkali like an acid and on warming the alkali metal salt with dilute mineral acid the original neutral substance is regenerated. It contains an α-hydroxy group because on heating with concentrated sulphuric at about 140° for one hour it yields approximately one mole of carbon monoxide for one equivalent of substance used. This has been found to be a quantitative method for determination of α-hydroxy acids. The substance therefore falls within the definition given hereinabove of compounds suitable to form non-amino peptides of β-alanine. Its molecular weight is about 120.

The molecular weight of pantothenic acid from which the aforementioned lactone is derived and the oxidation equivalent of pantothenic acid exclude the probability that the lactone portion of the molecule contains more than six carbon atoms. The crude lactone, above described, may be purified by distillation in a molecular still. When so purified it reacts with β-alanine and derivatives thereof to form a product indistinguishable from pantothenic acid in respect to its physiological action. This lactone is α-hydroxy-β,β-dimethyl-γ-butyro-lactone. This is the lactone obtained by the lactonization of α,γ-dihydroxy-β,β-dimethyl-n-butyric acid.

Other lactones of similar character to those described hereinabove may also be condensed in like manner with β-alanine esters and hydrolysed to produce kindred physiologically active substances.

It is, of course, to be understood that, if desired, other esters of β-alanine, such as the methyl ester, and salts of β-alanine may be used instead of the ethyl ester employed in the processes described in the specific examples. Likewise, β-alanine itself may be used in the reaction in place of esters and salts thereof.

Some of the lactones described in the foregoing specific examples and a number of others which may be used to practice the invention had not been prepared prior to this invention and methods of preparing some of these lactones follow.

The α-hydroxy-γ-n-valerolactone employed in Example 1 may be prepared by the following procedure:

57 grams of freshly prepared crude aldol (MacLeod, Amer. Chem. J., 37, 29) are dissolved in 50 cc. of 95% ethanol and the solution is cooled in an ice bath. 50 cc. of anhydrous hydrogen cyanide are added and then 2 cc. of 28% ammonium hydroxide are added, which causes the temperature of the solution to rise. The reaction mixture is held at 0° C. for one hour and then is allowed to stand at room temperature for three hours. The reaction mixture is then added to a solution composed of 1 cc. of concentrated sulphuric acid dissolved in 250 cc. of water, the liquid is heated for three hours on a steam bath to remove the excess hydrogen cyanide and is boiled under a reflux condenser for three hours more. 100 grams of crystalline barium hydroxide are then added and the reaction mixture is heated under reflux for ten hours. Upon cooling an excess of 25% sulphuric acid is added, the resulting barium sulphate is removed and the solution is concentrated to a volume of about 100 cc. The solution is then treated with the quantity of sodium bicarbonate necessary to neutralize the free acid and the solution is continuously extracted with ether for fourteen hours, after which the ether is removed leaving a thick reddish liquid. The latter material is distilled twice at a pressure of 0.025 mm. and a temperature of 130°. The distillation product, a reddish yellow oil, is α-hydroxy-γ-n-valerolactone.

The α-hydroxy-β-methyl-γ-n-butyrolactone used in the process of Example 2 is prepared as follows:

A mixture of 250 grams of propionaldehyde in 500 cc. of methanol is cooled on an ice bath and 130 grams of paraformaldehyde are added. 10 grams of potassium carbonate dissolved in 10 cc. of water are added and the solution is stirred for eight days. After this interval of stirring, 7 grams of tartaric acid are added, the solution is filtered and volatile material is removed at 60° C. with a water pump, leaving a viscous, greenish yellow liquid. This liquid is dissolved in 200 cc. of 95% ethanol and the solution treated with 107 cc. of liquid hydrogen cyanide. By following a procedure similar to that described the preparation of α-hydroxy-γ-n-valerolactone, a viscous oil is obtained which upon distilling twice at 100–130° C. at a pressure of 0.03 mm. yields a greenish yellow oil. This product is α-hydroxy-β-methyl-γ-n-butyrolactone.

Other lactones suitable for condensing with esters or salts of β-alanine are made by similar methods. To prepare the lactones of α-hydroxy acids appropriate aldehydes are caused to undergo the aldol type of condensation. The aldehyde group of the resulting product is converted into a cyanohydrin group by the action of hydrocyanic acid and the nitrile group of the latter is hydrolysed to the carboxyl group. The products readily form lactones by splitting off water.

An alternative method useful in certain cases consists in reducing the simple lactones of corresponding structure, but with one less carbon atom than the desired product, to the hydroxy aldehydes, then adding hydrocyanic acid to produce the cyanohydrin and hydrolysing this with dilute mineral acid. The following reactions are performed using butyrolactone as an example of a starting material:

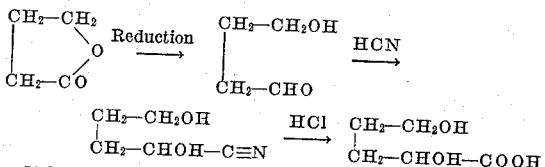

What is claimed is:

1. The method of synthesizing pantothenic acid which comprises heating a lower alkyl ester of β-alanine with α-hydroxy-β,β-dimethyl-γ-butyrolactone.

2. The method of synthesizing pantothenic acid which comprises directly combining a lower alkyl ester of β-alanine with α-hydroxy-β,β-dimethyl-γ-butyro lactone.

3. The method of synthesizing pantothenic acid which comprises directly combining a lower alkyl ester of β-alanine with α-hydroxy-β,β-dimethyl-γ-butyro lactone, and hydrolizing the resulting product to the free acid.

4. The method of synthesizing pantothenic acid which comprises directly combining the ethyl ester of β-alanine with α-hydroxy-β,β-dimethyl-γ-butyro lactone, and hydrolizing the resulting product to the free acid.

5. The method of synthesizing pantothenic acid which comprises directly combining the methyl ester of β-alanine with α-hydroxy-β,β-dimethyl-γ-butyro lactone, and hydrolizing the resulting product to the free acid.

ROGER J. WILLIAMS.

REFERENCES CITED

The following references are of record in the file of this patent:

UNITED STATES PATENTS

| Number | Name | Date |
|---|---|---|
| 1,285,248 | La Forge | Nov. 19, 1918 |
| 2,056,126 | Reichstein | Sept. 29, 1936 |
| 2,063,987 | Dreyfus | Dec. 15, 1936 |

OTHER REFERENCES

Chemical Abstracts, vol. 23 (1929), pp. 1113, 2991.

Glaser "Monatsh für Chemie," vol. 25, page 46 (1904).

Wijk: Rec. de trav. Chim. de Pay-Bas, vol. 40, p. 226 (1921).

Jukes et al.: J. Biol. Chem., vol. 114, pp. 109–111.

Williams: J. Am. Chem. Soc., vol. 60, pp. 2719–2722; ibid., vol. 55, pp. 2924–2725.

Snell et al.: Biochem. Jour., vol. 31, pp. 1791–1795.

Snell et al.: J. of Bacteriology, vol. 38, pp. 293–304.